United States Patent
Chen

(10) Patent No.: US 10,205,650 B2
(45) Date of Patent: Feb. 12, 2019

(54) ROUTING SYSTEM WITH LEARNING FUNCTIONS AND ROUTING METHOD THEREOF

(71) Applicant: MOXA INC., New Taipei (TW)

(72) Inventor: Ching-Hung Chen, New Taipei (TW)

(73) Assignee: MOXA INC., New Taipei (TW)

( * ) Notice: Subject to any disclaimer, the term of this patent is extended or adjusted under 35 U.S.C. 154(b) by 224 days.

(21) Appl. No.: 15/169,755

(22) Filed: Jun. 1, 2016

(65) Prior Publication Data

US 2017/0353378 A1    Dec. 7, 2017

(51) Int. Cl.
| | |
|---|---|
| H04L 12/24 | (2006.01) |
| H04L 12/751 | (2013.01) |
| H04L 12/741 | (2013.01) |
| H04L 12/935 | (2013.01) |
| H04L 12/701 | (2013.01) |

(52) U.S. Cl.
CPC .............. *H04L 45/08* (2013.01); *H04L 45/74* (2013.01); *H04L 49/3009* (2013.01)

(58) Field of Classification Search
CPC .... H04L 45/00; H04L 63/0236; H04L 61/256
See application file for complete search history.

(56) References Cited

U.S. PATENT DOCUMENTS

| | | | | |
|---|---|---|---|---|
| 2004/0136356 A1* | 7/2004 | Kuo | ................... | H04L 29/12386 370/351 |
| 2006/0002385 A1* | 1/2006 | Johnsen | ................... | H04L 49/25 370/389 |
| 2008/0049752 A1* | 2/2008 | Grant | ................... | H04L 12/4641 370/392 |

* cited by examiner

*Primary Examiner* — Charles C Jiang
*Assistant Examiner* — Will W Lin
(74) *Attorney, Agent, or Firm* — Chih Feng Yeh; Huntington IP Consulting Co., Ltd.

(57) ABSTRACT

The present disclosure illustrates a routing system with learning functions and a routing method thereof. By detecting a raw packet's packet header and an entry port receiving the raw packet, a routing message is queried from a path table by the packet header and the entry port. When there is not the routing message, the raw packet is routed by a kernel and the routing result is recorded in the path table to be the routing message. When there is the routing message, the packet header of the raw packet is replaced with a modified packet header recorded in the routing message, to form a modified packet, and the modified packet is transmitted from the transmission port recorded in the routing message, to achieve the technical effect of improving the routing performance for the packets with the same packet headers and the same entry ports.

5 Claims, 4 Drawing Sheets

| Path table |||
|---|---|---|
| Routing message 1 |||
| Raw packet header | Ethernet Destination MAC | 00:90:e8:00:00:01 |
| | Ethernet Source MAC | 00:00:00:00:00:01 |
| | Vlan id | 1 |
| | Source IP | 192.168.127.1 |
| | Destination IP | 192.168.128.1 |
| | Protocol | UDP |
| | Source Port | 100 |
| | Destination port | 200 |
| Modified packet header | Ethernet Destination MAC | 00:00:00:00:00:02 |
| | Ethernet Source MAC | 00:90:e8:00:00:01 |
| | Vlan id | 2 |
| | Source IP | 192.168.128.254 |
| | Destination IP | 192.168.128.1 |
| | Protocol | UDP |
| | Source Port | 1000 |
| | Destination port | 2000 |
| Transmission port | Port 2 ||
| Entry port | Port 1 ||
| Routing message 2 |||
| ...... |||
| Routing message 3 |||
| ...... |||

Fig. 4

ROUTING SYSTEM WITH LEARNING FUNCTIONS AND ROUTING METHOD THEREOF

TECHNICAL FIELD

The present disclosure relates to a routing system and a method thereof, more particularly, to a routing system with learning functions and a method thereof for improving the routing effect when packets have the same packet headers and the same entry ports.

RELATED ART

In recent years, as the process on Internet developing prosperously, how to improve packets' routing performance for further improving the speed and the reliability on Internet, becomes an urgent problem to be resolved for many companies.

Generally speaking, a traditional packet routing means that a kernel may use a routing table to perform the routing process for each received packet gradually, where a default routing path is recorded in the routing table in advance, to forward the packet to next terminal according to the default routing path. Thus, a good or bad routing path recorded in the routing table will be a major factor for affecting the routing performance. In other words, a non-appropriate or incorrect routing path may cause inefficient routing performance.

In view of this, a dynamic routing technology is proposed. It uses each algorithm and routing protocol to establish and maintain the routing table, to keep the routing table in an optimal status. However, the number of the packets transmitted on Internet is very huge. Assumed that the packets have the same packet headers and the same entry ports. If each of the packets is still routed according to the routing table in the kernel, lots of processing time must be spent. Therefore, this approach may still not solve the problem of inefficient routing performance.

In conclusion, the problem of inefficient routing performance is existed in prior arts for a long time. So it is necessary to propose an improved technical means to solve the aforesaid problem.

SUMMARY

The present disclosure provides a routing system with learning functions and a routing method thereof.

At first, the present disclosure provides a routing system with learning functions. The routing system may be applied to a routing device with a plurality of ports, and includes a storage module, a transmission module, a detection module, a query module and a processing module. Further, the storage module is configured to store a path table. The transmission module is configured to receive a raw packet from one of the plurality of ports and transmit a modified packet from one of the plurality of ports. The detection module is configured to detect the port receiving the raw packet to be an entry port, and read the packet header of the raw packet to be a raw packet header. The query module is configured to query a routing message from the path table, where the routing message is in accordance with the raw packet header and the entry port. When there is not the routing message, the processing module is configured to use a kernel to transform the raw packet into the modified packet by Network Address Transformation (NAT), and choose one of the plurality of ports to be a transmission port transmitting the modified packet according to a routing table of the kernel. And, the processing module is configured to record the raw packet header, a modified packet header of the modified packet, the entry port and the transmission port of the modified packet in the path table to be the routing message, and transmit the modified packet from the transmission port. Besides, when there is the routing message, the processing module may replace the packet header of the raw packet with the modified packet header in the routing message to form the modified packet, and transmit the modified packet from the transmission port recorded in the routing message.

Furthermore, the present disclosure provides a routing method with learning functions. The routing method may be applied to a routing device with a plurality of ports, and includes following steps. A path table is provided. A raw packet is received from one of the plurality of ports. The port receiving the raw packet is detected to be an entry port and the packet header of the raw packet is accessed to be a raw packet header; and querying the routing message from the path table, where the routing message is in accordance the raw packet header and the entry port. When there is not the routing message, a kernel performs Network Address Transformation (NAT) to transform the raw packet into the modified packet, and one of the plurality of ports may be chosen to be a transmission port transmitting the modified packet according to a routing table of the kernel. And, the raw packet header, a modified packet header of the modified packet, the entry port and the transmission port of the modified packet are recorded in the path table as the routing message, and the modified packet is transmitted from the transmission port. When there is the routing message, the packet header of the raw packet is replaced with the modified packet header in the routing message to form the modified packet, and the modified packet is transmitted from the transmission port recorded in the routing message.

The disclosed system the method thereof of the present disclosure are shown as above. The major difference between the prior art and the present disclosure is that technology of the present disclosure detects the received raw packet's packet header and the entry port receiving the raw packet and then queries the routing message from the path table according to the detection result, where the routing message is in correspondence with the packet header and the entry port. When there is not the routing message, the raw packet is routed by the kernel and the routing result is recorded in the path table as the routing message. Besides, when there is the routing message, the packet header of the raw packet is replaced with the modified packet header recorded in the routing message to form the modified packet, and the modified packet is transmitted from the transmission port recorded in the routing message.

By the above technical means, the present disclosure may achieve the effect of improving the routing performance for the packets with the same packet headers and the same entry ports.

BRIEF DESCRIPTION OF THE DRAWINGS

FIG. 4 is a schematic diagram of a path table of the present disclosure.

DETAILED DESCRIPTION

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

Before illustrating the routing system with learning functions and the method thereof of the present disclosure, the related terms defined by the present disclosure are described first. The path table of the present disclosure indicates a table recording a routing message of raw packet headers, modified packet headers, entry ports and transmission ports. The routing message is the information relating to a raw packet's routing process completed by a kernel. The difference between the path table and the routing table is that the former is used before the raw packet enters the kernel, and the latter is used for routing after the raw packet enters the kernel. It's worth noting that the message recorded in the latter is unlike the one in the former. The message in the latter includes a corresponding relation among a network segment, a subnet mask and a transmission port.

Figure 1:
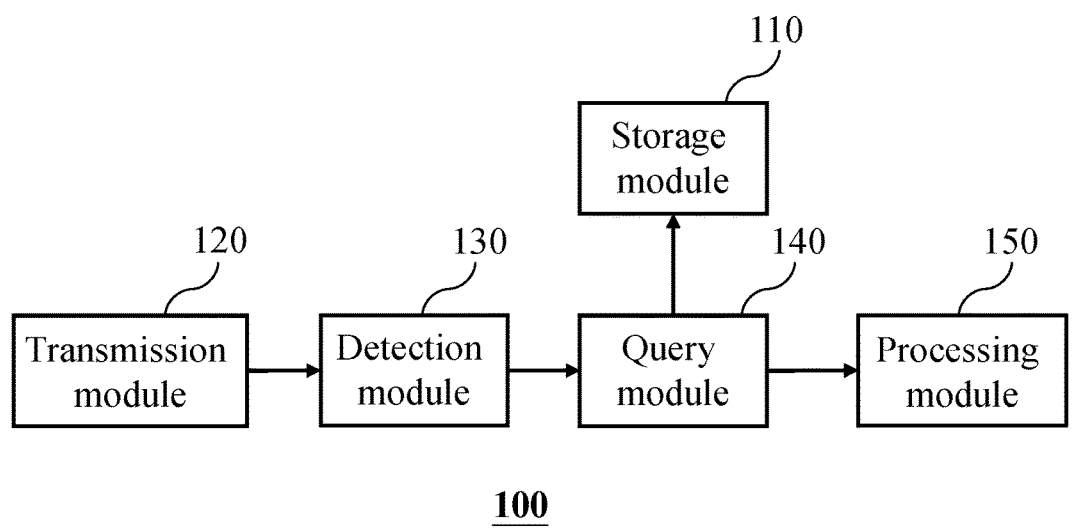
FIG. 1 is a block diagram of a routing system with learning functions of the present disclosure.

The accompanying drawings are included to provide a further understanding of the routing system with learning functions and the method thereof of the present disclosure. Please refer to FIG. 1, which is a block diagram of a routing system with learning functions of the present disclosure. The routing system 100 is applied to a routing device with a plurality of ports, and includes a storage module 110, a transmission module 120, a detection module 130, a query module 140 and a processing module 150, where the storage module 100 is configured to store a path table. In an embodiment of the present disclosure, the path table is empty in the beginning, and the raw packet header, the modified packet header, the entry port and the transmission port may be recorded as the routing message by using a text file or a database. The raw packet header and the modified packet header may record the messages in data link layer, network layer and transport layer, including MAC (Media Access Control), IP (Internet Protocol), VLAN (Virtual Local Area Network), TCP (Transmission Control Protocol), UDP (User Datagram Protocol), port number and so on.

The transmission module 120 is configured to receive the raw packet from one of the plurality of ports and transmit the modified packet from one of the plurality of ports. In an embodiment of the present disclosure, the port may be an Ethernet RJ-45 connector, and the raw packet may be the Ethernet packet which is received from the port. The modified packet is an Ethernet packet with a modified, replaced or changed packet header. For example, the packet header may be modified, replaced or changed by using the path table or Network Address Translation (NAT).

The detection module 130 is configured to detect the port receiving the raw packet to be the entry port, and read the packet header of the raw packet to be the raw packet header. In an embodiment of the present disclosure, reading the packet header of the raw packet means that the messages in data link layer, network layer and transport layer are read. For example, the message of the source MAC, the destination MAC, VLAN, the source IP, the destination IP, TCP, UPD, the source port number, the destination port number and so on.

The query module 140 is configured to query the routing message from the path table stored in the storage module 110, where the routing message is in accordance with the raw packet header and the entry port. After receiving the raw packet, the detection module 130 acquires the raw packet header and the entry port. Therefore, the query module 140 queries the path table by the raw packet header and the entry port to check if there is a corresponding routing message in the path table. That is to say, the routing message may include the same raw packet header and the same entry port. Then, the modified packet header and the transmission port recorded in the routing message may be acquired later.

When the routing message does not exist (that is, the query module 140 does not get the corresponding routing message), the processing module 150 transforms the raw packet into the modified packet by the kernel, take Linux Kernel as an example, and chooses one of the plurality of ports to be a transmission port transmitting the modified packet according to a routing table of the kernel. And, the processing module 150 records the raw packet header, a modified packet header of the modified packet, the entry port and the transmission port of the modified packet in the path table as the routing message, and then transmits the modified packet from the transmission port. Besides, when the routing message exists, the processing module 150 replaces the packet header of the raw packet with the modified packet header in the routing message, to form the modified packet, and then transmits the modified packet from the transmission port recorded in the routing message. In an embodiment of the present disclosure, the corresponding relation among the network segment, the subnet mask and the transmission port is recorded in the routing table of the kernel. The routing table may be illustrated as below.

|  | Segment/Subnet mask | Transmission port |
| --- | --- | --- |
| Routing rule 1 | 192.168.128.0/24 | Port2 |
| Routing rule 2 | 192.168.127.0/24 | Port1 |

It's worth noting that when the corresponding relation is changed, the processing module 150 can reset the path table. For example, the path table may be cleared to enable the routing system 100 to generate the routing message according to the routing table. And, it may prevent a packet transmission error to happen when the network topology is changed.

Figure 2:
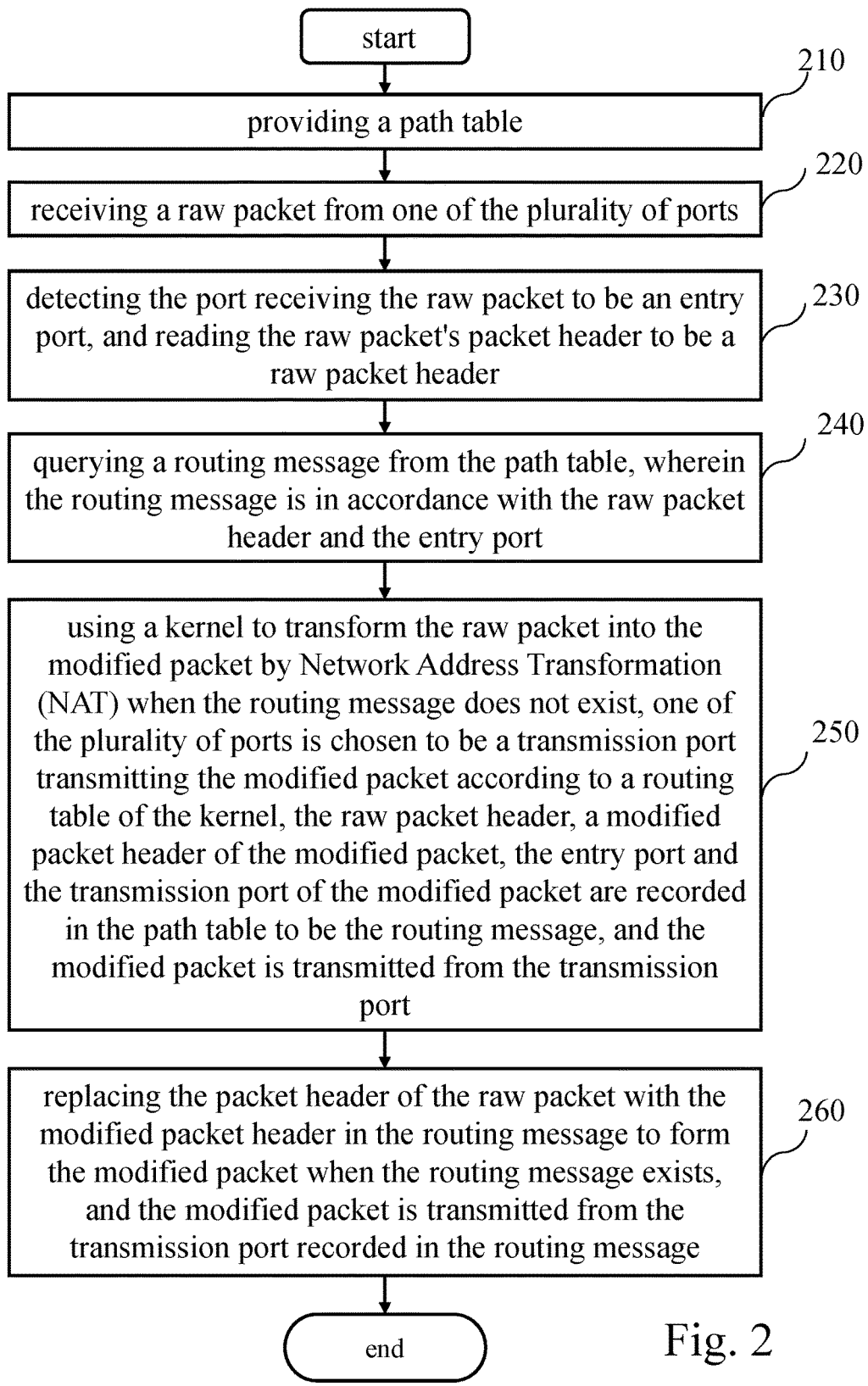
FIG. 2 is a flow chart of a routing method with learning functions of the present disclosure.

Next, please refer to FIG. 2, which is a flow chart of a routing method with learning functions of the present disclosure. The routing method may be applied to a routing device with a plurality of ports, and includes the steps as below. The step 210 is to provide a path table. The step 220 is to receive a raw packet from one of the plurality of ports. The step 230 is to detect the port receiving the raw packet to be the entry port and then read the raw packet's packet header to be the raw packet header. The step 240 is to query the routing message from the path table, where the routing message is in accordance with the raw packet header and the entry port. At the step 250, when there is not the routing message, the raw packet is transformed into the modified packet by using Network Address Transformation (NAT) by a kernel, and one of the plurality of ports is chosen to be the transmission port transmitting the modified packet according to the routing table of the kernel. And, the raw packet header, the modified packet header of the modified packet, the entry port and the transmission port of the modified packet are recorded in the path table to be the routing message, and the modified packet is transmitted from the transmission port. At the step 260, when there is the routing message, the packet header of the raw packet may be replaced with the modified packet header in the routing message, so as to form the modified packet, and the modified packet may be transmitted from the transmission port recorded in the routing message. With the aforesaid steps, the raw packet's packet header and the entry port receiving the raw packet may be detected, and the routing message is queried from the path table by the packet header and the entry port. When there is not the routing message, the raw packet is routed by the kernel and the routing result is recorded in the path table to be the routing message. And, when there is the routing message, the packet header of the raw packet is replaced with a modified packet header recorded in the routing message, to form the modified packet, and the modified packet is transmitted from the transmission port recorded in the routing message.

Figure 3:
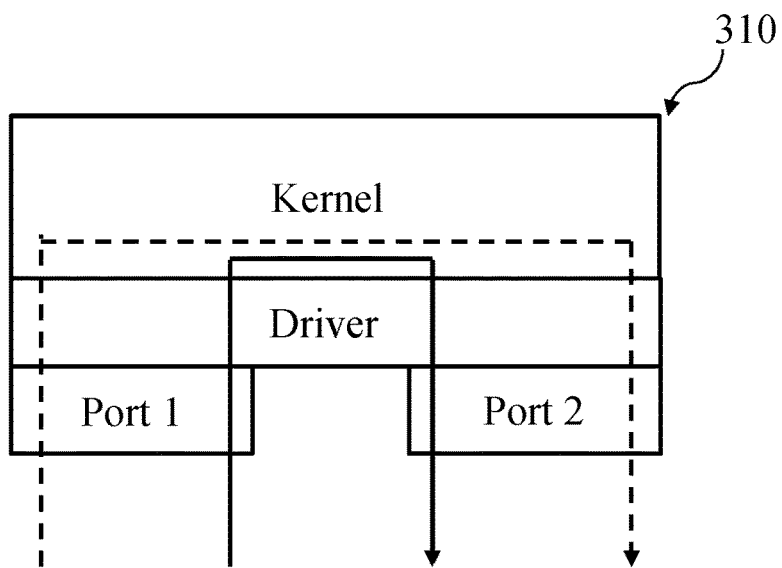
FIG. 3 is a schematic diagram showing a comparison of processing packets between the prior art and the present disclosure.
Figure 3:
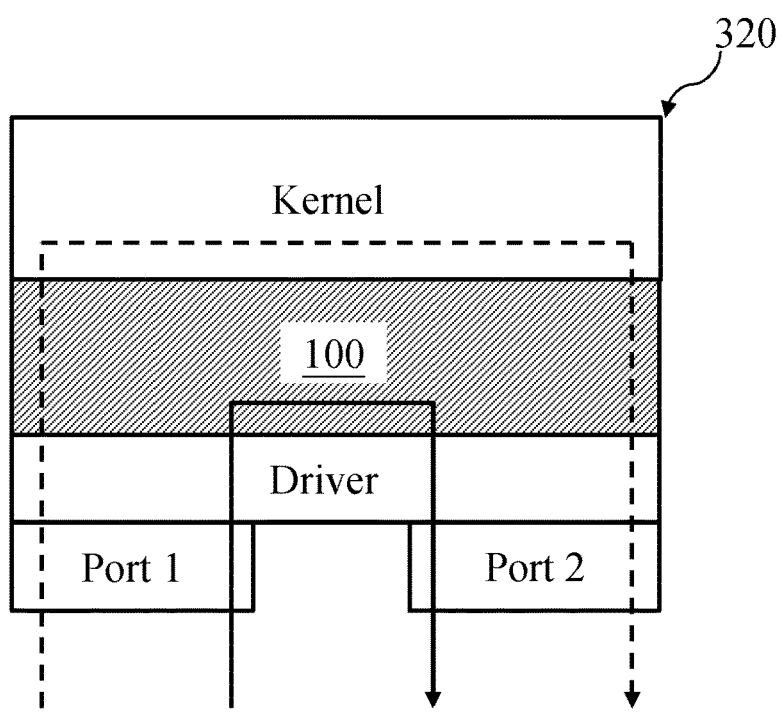

FIG. 3 and FIG. 4 are presented to provide a further understanding of following embodiments of the present disclosure. Firstly, please refer to FIG. 3, which is a schematic diagram showing a comparison of processing packets used by those skilled in the art and the processing packets utilized in the present disclosure. The top half of FIG. 3 is the traditional architecture 310 and the bottom half of FIG. 3 is the architecture 320 utilized in the present disclosure. The arrow with the dotted line is the processing flow for the first packet. The arrow with the solid line is the processing flow for the packets with the same packet header and the same entry port. For example, the port 1 of FIG. 3. From the prior art's architecture 310, it's easy to understand that no matter the packets have the same headers and the same entry ports or not, all packets are processed by the kernel and they are routed one-on-one gradually, so much time may be spent. On the other hand, from the architecture 320 applied by the present disclosure, it's easy to understand that for all packets with the same packet headers and the same entry ports, only the first packet will be processed by the kernel. The latter second, third and fourth one are processed by the way shown as the arrows of the solid lines. In other words, by using the routing system 100 of the present disclosure, the packets may be forwarded correctly via the port 2 and they are not processed by the kernel.

Particularly, assumed that there are two clients, and the first one is connected to the port 1 and the second one is connected to the port 2. The first client wants to transmit packets to the second client by using the routing device of the present disclosure. The first client's IP and MAC are "192.168.127.1" and "00:00:00:00:00:01", respectively. The second client's IP and MAC are "192.168. 128.1" and "00:00:00:00:00:02", respectively. The packet headers of the packets transmitted by the first client are shown as below.

| Packet header | |
|---|---|
| Ethernet Destination MAC | 00:90:e8:00:00:01 |
| Ethernet Source MAC | 00:00:00:00:00:01 |
| Vlan id | 1 |
| Source IP | 192.168.127.1 |
| Destination IP | 192.168.128.1 |
| Protocol | UDP |
| Source port | 100 |
| Destination port | 200 |

When the multiple packets enter the port 1 sequentially, the following steps will be performed.

1. The first packet (Packet 1) is blocked by the routing system 100 after it enters the port 1.
2. Check the path table if there is a routing message corresponding to the packet header of the first packet.
3. The path table is empty at the beginning, so no routing message could be found to process the first packet.
4. The first packet is transmitted to the kernel, such as Linux Kernel, for further processing.
5. The kernel performs an appropriate processing on the first packet and modifies it by NAT. The packet header of the first packet is modified as below.

| Modified packet header of the first packet | |
|---|---|
| Ethernet Destination MAC | 00:00:00:00:00:02 |
| Ethernet Source MAC | 00:90:e8:00:00:01 |
| Vlan ID | 2 |
| Source IP | 192.168.128.254 |
| Destination IP | 192.168.128.1 |
| Protocol | UDP |
| Source port | 1000 |
| Destination port | 2000 |

6. The kernel transmits the first packet to the port 2 according to the routing table.
7. The first packet is blocked by the routing system 100 before it is transmitted to the port 2 by the kernel.
8. Create a new rule in the path table, for example, the routing message 1.
9. Record the raw packet header of the first packet to a field of a raw packet header in the routing message 1.
10. Record the modified packet header of the first packet to a field of a modified packet header in the routing message 1.
11. The port (such as the port 1 taken as an example) where the first packet enters, is recorded to a field of an entry port in the routing message 1.
12. The port (such as the port 2 taken as an example) transmitting the first packet is recorded to a field of a transmission port in the routing message 2.
13. Forward the first packet to the port 2 after the above information is added.
14. The second client successfully receives the first packet.

Further, the routing message 1 recorded in the path table may be illustrated as below.

| Path table Routing message 1 | | |
|---|---|---|
| Raw packet header | Ethernet Destination MAC | 00:90:e8:00:00:01 |
| | Ethernet Source MAC | 00:00:00:00:00:01 |
| | Vlan id | 1 |
| | Source IP | 192.168.127.1 |
| | Destination IP | 192.168.128.1 |
| | Protocol | UDP |
| | Source Port | 100 |
| | Destination port | 200 |
| Modified packet header | Ethernet Destination MAC | 00:00:00:00:00:02 |
| | Ethernet Source MAC | 00:90:e8:00:00:01 |
| | Vlan id | 2 |
| | Source IP | 192.168.128.254 |
| | Destination IP | 192.168.128.1 |
| | Protocol | UDP |
| | Source Port | 1000 |
| | Destination port | 2000 |
| Transmission port | Port 2 | |
| Entry port | Port 1 | |

Next, when the first client continues to transmit the second packet (such as the packet 2) to the port 1, the related steps are shown as below.

a. The second packet is blocked by the routing system 100.

b. Check whether the two fields including the field of the raw packet header and the field of the entry port, in the routing message of the path table match with the ones of the second packet.

c. Find out that the fields in the routing message 1 match with the ones of the second packet.

d. Modify the second packet according to the modified packet header in the routing message 1. For example, the packet header of the second packet may be replaced with the information of the record recorded in the modified packet header.

e. The second packet may be transmitted from the port recorded in the field of the transmission port in the routing message 1, for example, the port 2.

f. The second client successfully receives the second packet.

As a result, the time of processing the second packet may be saved because the kernel processing is skipped, so as to improve the routing performance. And so forth, the third and fourth packets containing the same raw packet headers and the same entry ports may be processed by the steps (a) to (f) without the kernel processing. Their packet headers may be replaced by the modified packet headers recorded in the queried routing message, and the packets may be transmitted to the second client from the transmission port recorded in the routing message. That is to say, after generating the routing message in the path table, the routing system 100 has learnt a transmission manner for the kind of the packets. The kernel processing to the packet will be skipped if the packets correspond to the routing message in the path table. Thus, the number of the packets having the same packet headers and the same entry ports (such as the longer time of playing a streaming video file) becomes more, the more time of processing the packets can be saved.

As illustrated in FIG. 4, this is a schematic diagram of a path table of the present disclosure. As mentioned above, the path table is empty in the beginning. After the first packet is routed successfully, the corresponding routing message will be generated and recorded in the path table. The routing message 1 in the path table 410 illustrated in FIG. 4 is taken as an example, if the packet header and the entry port of a next packet do not match the routing message in the path table 410, the other routing message will be generated again and recorded in the path table 410. For example, the routing message 2 in FIG. 4, and so forth. If the information of a packet after the next packet does not match again, a corresponding message 3 will be generated and recorded, and so on.

In summary, the major difference between the present disclosure and the prior art is that the technology of the present disclosure detects the raw packet's packet header and the entry port receiving the raw packet, so as to query the routing message from the path table by the packet header and the entry port. When there is not the routing message, the raw packet is routed by the kernel and the routing result is recorded in the path table to be the routing message. And, when there is the routing message, the packet header of the raw packet is replaced with the modified packet header recorded in the routing message, to form the modified packet, and the modified packet is transmitted from the transmission port recorded in the routing message. With the technical means, the problem existed in the prior art may be solved, so as to achieve the technical effect of improving the routing performance for the packets with the same packet headers and the same entry ports.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A routing method with learning functions, applied to a routing device with a plurality of ports, and the routing method comprising the steps of:
providing a path table;
receiving a raw packet from one of the plurality of ports;
detecting the port receiving the raw packet to be an entry port, and reading the raw packet's packet header to be a raw packet header;
querying a routing message from the path table, wherein the routing message is in accordance with the raw packet header and the entry port;
using a kernel to transform the raw packet into the modified packet by Network Address Transformation (NAT) when the routing message does not exist, one of the plurality of ports is chosen to be a transmission port transmitting the modified packet according to a routing table of the kernel, the raw packet header, a modified packet header of the modified packet, the entry port and the transmission port of the modified packet are recorded in the path table to be the routing message, and the modified packet is transmitted from the transmission port; and
replacing the packet header of the raw packet with the modified packet header in the routing message to form the modified packet when the routing message exists, and the modified packet is transmitted from the transmission port recorded in the routing message.

2. The routing method with learning functions of claim 1, wherein the path table is empty in the beginning, and the raw packet header, the modified packet header, the entry port and the transmission port are recorded as the routing message by using a text file or a database.

3. The routing method with learning functions of claim 1, wherein a corresponding relation among a network segment, a subnet mask and the transmission port is recorded in the routing table and the path table is reset when the corresponding relation recorded in the routing table is changed.

4. The routing method with learning functions of claim 1, wherein the raw packet and the modified packet are Ethernet packets.

5. The routing method with learning functions of claim 1, wherein the raw packet header and the modified packet header record messages in data link layer, network layer and transport layer.

* * * * *